United States Patent
Singhal et al.

(10) Patent No.: US 12,526,720 B2
(45) Date of Patent: Jan. 13, 2026

(54) MECHANISM FOR ACHIEVING ULTRA-LOW LATENCY PACKET PROCESSING AT CU-UP

(71) Applicant: Parallel Wireless, Inc., Nashua, NH (US)

(72) Inventors: Mukesh Singhal, Pune (IN); Nikhil Agarwal, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 291 days.

(21) Appl. No.: 18/068,532

(22) Filed: Dec. 20, 2022

(65) Prior Publication Data

US 2023/0217341 A1    Jul. 6, 2023

Related U.S. Application Data

(60) Provisional application No. 63/285,543, filed on Dec. 3, 2021.

(51) Int. Cl.
*H04W 40/02* (2009.01)
*H04W 80/02* (2009.01)
*H04W 88/16* (2009.01)

(52) U.S. Cl.
CPC ............ *H04W 40/02* (2013.01); *H04W 80/02* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 11,677,668 B1* | 6/2023 | Urias | H04L 43/18 709/224 |
| 2010/0091710 A1* | 4/2010 | Jung | H04W 36/0019 370/328 |
| 2017/0359269 A1* | 12/2017 | Zhang | H04L 47/6275 |
| 2018/0159860 A1* | 6/2018 | Pope | H04L 49/901 |
| 2018/0357176 A1* | 12/2018 | Wang | G06F 9/526 |

(Continued)

OTHER PUBLICATIONS

5G; NG-RAN; Architecture description (3GPP TS 38.401 version 15.2.0 Release 15), Jul. 2018.

(Continued)

*Primary Examiner* — Wutchung Chu
*Assistant Examiner* — Berhanu D Belete
(74) *Attorney, Agent, or Firm* — Michael Y. Saji

(57) ABSTRACT

In one embodiment, a method is disclosed, comprising: receiving a packet; processing the packet in a Control Unit-User Plane (CU-UP) as a user-space application with kernel-bypass networking; performing packet Input/Output (I/O) by the CU-UP user-space application, wherein the CU-UP performs Internet Protocol (IP) validation on received user-plane packets before processing Packet Data Convergence Protocol (PDCP), Service Data Adaptation Protocol (SDAP) and General Packet Radio Service Tunnelling Protocol (GTPU) protocol stack and performing direct I/O to a Network Interface Controller (NIC) for sending the packet over a network to a Distributed Unit (DU). The method may further comprise using a containerized CU-UP. The method may further comprise using a plurality of worker threads. The method may further comprise using a polling user space networking accelerator framework.

4 Claims, 8 Drawing Sheets

(56) References Cited

U.S. PATENT DOCUMENTS

| | | | | |
|---|---|---|---|---|
| 2019/0173789 A1* | 6/2019 | Shalev | .................. | H04L 45/745 |
| 2019/0256415 A1* | 8/2019 | Jain | ...................... | C04B 28/021 |
| 2019/0373666 A1* | 12/2019 | Khan | .................. | G06F 9/45558 |
| 2021/0352550 A1* | 11/2021 | Dandekar | ............. | H04W 4/025 |
| 2022/0117006 A1* | 4/2022 | Godin | .................. | H04W 76/25 |
| 2023/0403625 A1* | 12/2023 | Wang | .................. | H04W 76/11 |

OTHER PUBLICATIONS

Gallenmüller et al.: "Comparison of Frameworks for High-Performance Packet IO". 2015 IEEE.

"5G NR Interfaces X2/Xn, S1/NG, F1 and E1 Functions", May 24, 2019, https://www.techplayon.com/5g-nr-interfaces-x2-xn-s1-ng-f1-and-e1-functions/, downloaded Dec. 16, 2022.

"5G NR gNodeB Functional Split : CU DU split", Mar. 31, 2020, https://www.5g-networks.net/5g-technology/gnodeb-gnb-cu-du-split/, downloaded Dec. 20, 2022.

* cited by examiner

MECHANISM FOR ACHIEVING ULTRA-LOW LATENCY PACKET PROCESSING AT CU-UP

CROSS-REFERENCE TO RELATED APPLICATIONS

The present application claims priority under 35 USC § 119 (e) to U.S. Prov. App. No. 63/285,543, titled "Mechanism for Achieving Ultra-Low Latency Packet Processing At CU-UP" and filed Dec. 3, 2021, hereby incorporated by reference in its entirety. In addition, the present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1; US20170055186A1; US20170273134A1; US20170272330A1; and Ser. No. 15/713,584. This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

The 3GPP 5G RAN architecture and known as NG-RAN, introduces new interfaces and functional modules. The NG-RAN consists of a set of radio base stations i.e. gNBs which is connected to 5GC (5G core network). The gNB has three main functional modules: the Centralized Unit (CU), the Distributed Unit (DU) and the Radio Unit (RU). The gNB-CU is further disaggregated into CU control plane (CU-CP) and CU data plane (CU-UP).

SUMMARY

This invention proposes mechanism for achieving ultra-low latency packet processing at a CU-UP node. In one embodiment, a method includes receiving a packet; processing the packet in a Control Unit-User Plane (CU-UP) as user-space application with kernel-bypass networking; performing packet Input/Output (I/O) by the CU-UP user-space application, wherein the CU-UP performs Internet Protocol (IP) validation on received user-plane packets before processing Packet Data Convergence Protocol (PDCP), Service Data Adaptation Protocol (SDAP) and General Packet Radio Service Tunnelling Protocol (GTPU) protocol stack and performing direct I/O to a Network Interface Controller (NIC) for sending packet over a network to a Distributed Unit (DU).

In one embodiment, a method is disclosed, comprising: receiving a packet; processing the packet in a Control Unit-User Plane (CU-UP) as a user-space application with kernel-bypass networking; performing packet Input/Output (I/O) by the CU-UP user-space application, wherein the CU-UP performs Internet Protocol (IP) validation on received user-plane packets before processing Packet Data Convergence Protocol (PDCP), Service Data Adaptation Protocol (SDAP) and General Packet Radio Service Tunnelling Protocol (GTPU) protocol stack and performing direct I/O to a Network Interface Controller (NIC) for sending the packet over a network to a Distributed Unit (DU). The method may further comprise using a containerized CU-UP. The method may further comprise using a plurality of worker threads. The method may further comprise using a polling user space networking accelerator framework.

DETAILED DESCRIPTION

The CU is disaggregated into CU control plane (CU-CP) and CU data plane (CU-UP).

CU-CP: This node handles RRC and the control plane part of the PDCP protocol. This node communicates with DU over F1-C interface and with CU-UP over E1 interface as defined in 3GPP specifications.

Figure 1:
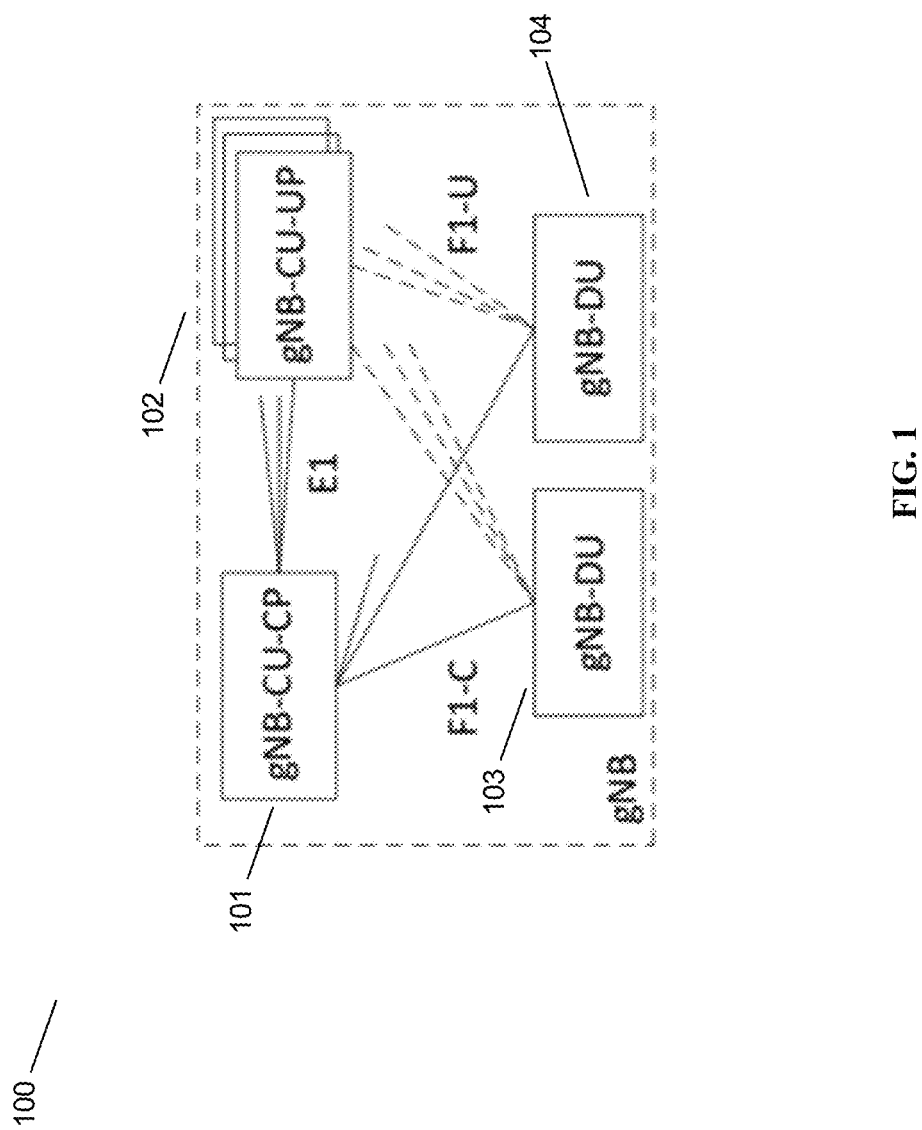
FIG. 1 shows a schematic diagram of a 5G gNodeB, in accordance with some embodiments.

FIG. 1 shows a schematic diagram 100 of a 5G gNodeB, in accordance with some embodiments. gNB-DU 103, 104 are in communication with a gNB-CU-CP control plane node 101 and a gNB-CU-UP user plane node 102. gNB-CU-UP may be a plurality of nodes that provide data service to gNB-DUs as needed, including a gateway to other networks. gNB-CU-CP and gNB-CU-UP may be in communication over an E1 protocol as needed to coordinate authentication, mobility, etc. for the gNBs 103, 104.

CU-UP: This node handles user plane part of PDCP protocol and SDAP protocol. It communicates with CU-CP over E1 interface and with DU over F1-U interface.

With 5G, there is requirement for ultra-low latency of user traffic. To achieve the same, one approach is to position CU-UP node on the edge for better network latency.

The present disclosure further enhances achieving ultra-low latency packet processing within the CU-UP node. In some embodiments, it is considered to run the packet processing in CU-UP as user-space application with kernel-bypass networking. Kernel-bypass networking removed the overheads of in-kernel network stacks by switching protocol processing to user-space.

Packet I/O is done directly by CU-UP user-space application. CU-UP would perform basic IP validation on received user-plane packets before processing PDCP, SDAP and GTPU protocol stack and then do direct I/O to NIC for sending packet over network to DU over F1-U or Core-network over S1-U interfaces (3gpp defined interfaces.)

CU-UP user-space application runs as a multi-threaded application for better handle more load during high user activity, ex. High throughput demands during rush hours.

Each thread on CU-UP would run in run-to-completion model and there by achieving ultra-low latency in user-place packet processing. In Run-to-completion model, each thread on receiving the packet performs all required protocol stack processing, ciphering/deciphering and then sends the packet over network.

Each CU-UP thread would receive packets from network, performs all required protocol stack (GTPU, PDCP including Ciphering/Deciphering, SDAP protocol stack), and then send packet to next node on network i.e. to DU over F1-U interface or to Core network on S1-U interface.

Typical life-of-packet per thread in CU-UP application is depicted in architectural diagram in next section.

Figure 2:
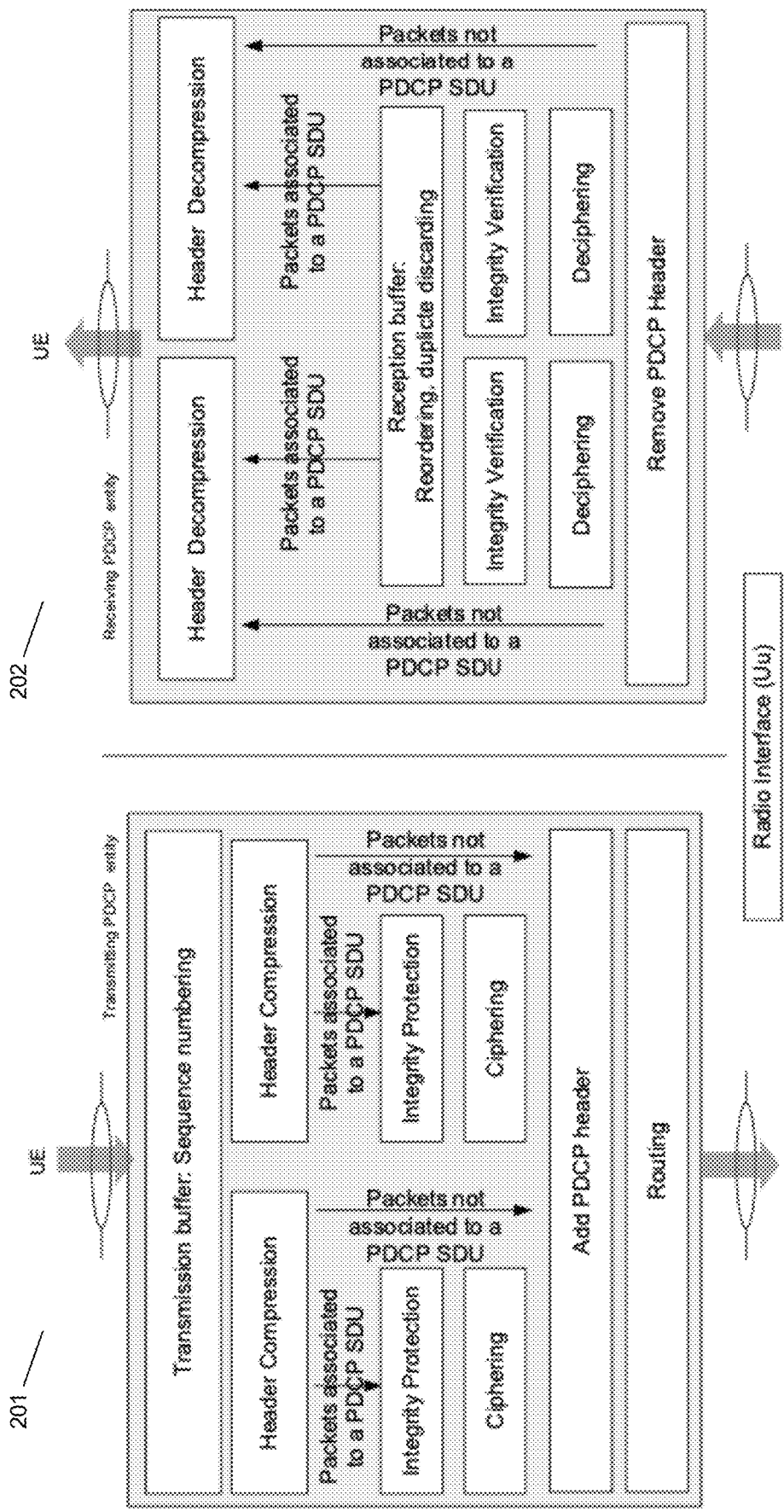
FIG. 2 shows a schematic diagram of PDCP header processing for uplink and downlink, in accordance with some embodiments.

FIG. 2 shows a schematic diagram of PDCP header processing for uplink and downlink according to packet data convergence protocol (PDCP) layer (3gpp TS 38323), in accordance with some embodiments. Diagram 201 shows uplink communications from UE to the base station at a PDCP layer. Diagram 202 shows downlink communications from the base station to the UE. For uplink 201, communications from UE are received at the gNB-DU and received in a transmission buffer as packets and numbered. Continuing, header compression is performed. For packets associated to a PDCP service data unit (SDU), integrity protection and ciphering are performed; for packets not associated to a PDCP SDU, no integrity protection and ciphering are performed. Both packets are processed by the addition of a PDCP header and routed using the PDCP header to the radio interface for further processing. A PDCP SDU is a bit string and is aligned by bytes, that is, a multiple of 8 bits, in length. From the first bit of the PDCP Data PDU, a compressed or uncompressed SDU is included.

For downlink 202, packets from the radio interface enter the PDCP layer and the PDCP header is removed. For packets associated to a PDCP SDU, deciphering integrity verification, and reordering, duplicate discarding via reception buffer are performed. For packets not associated to a PDCP SDU, the deciphering, integrity verification, and buffering are omitted. Finally, header decompression is performed before being output to the UE via the downlink interface.

Figure 3:
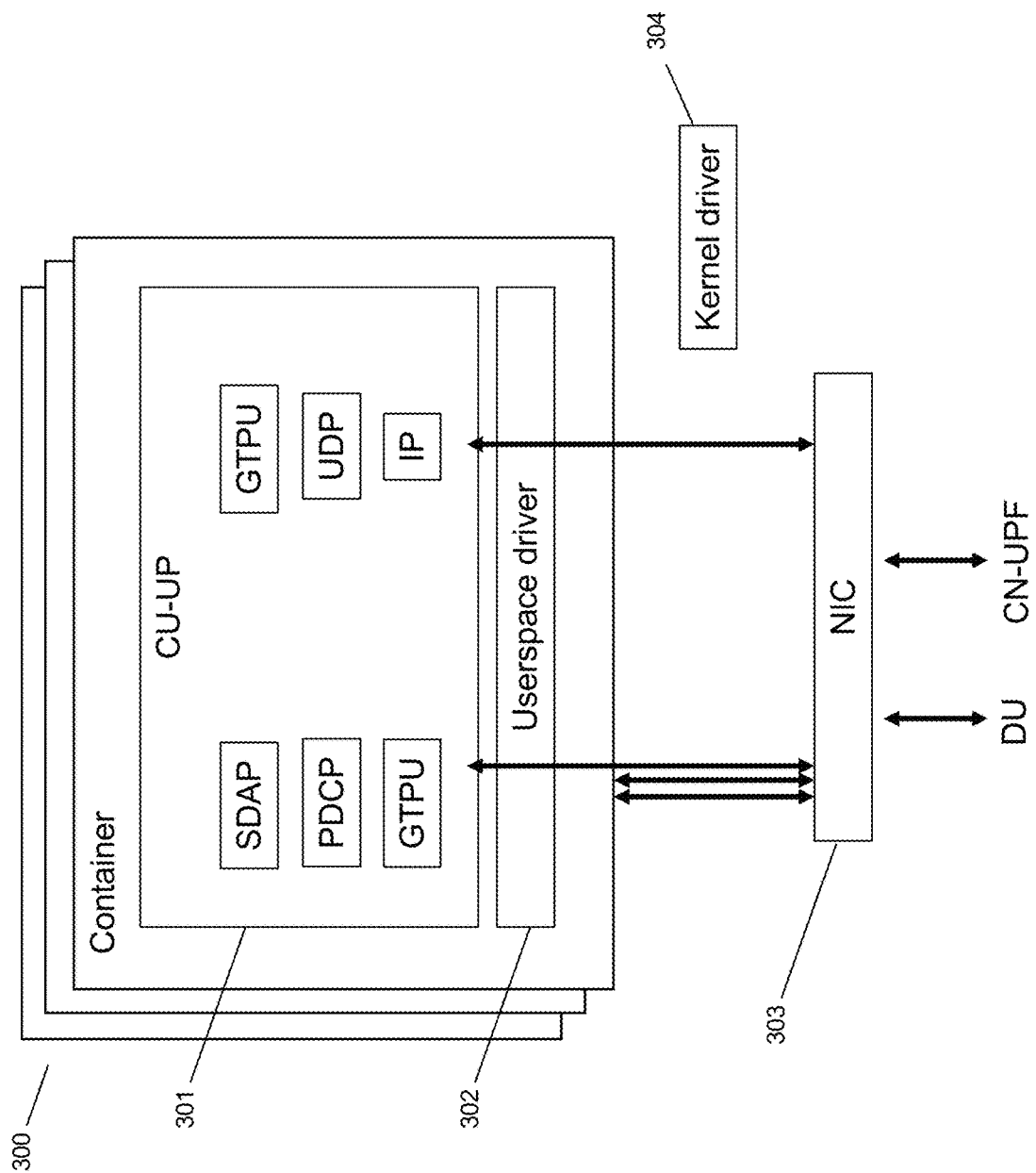
FIG. 3 shows a schematic diagram of a containerized userspace CU-UP, in accordance with some embodiments.

FIG. 3 shows a schematic diagram of a containerized userspace CU-UP, in accordance with some embodiments. Network interface card (NIC) 303 shows communications to and from the DU and the CN-UPF (core network user plane function). The NIC passes communications to container 300, which includes CU-UP 301 and userspace driver 302. Communications between the NIC and the userspace containers bypasses kernel driver 304 and utilizes userspace driver 302. CU-UP 301 includes SDAP, PDCP, GTPU, UDP, and IP functionality. By using userspace driver 302, network performance is increased and the kernel is not blocked. The container, CU-UP, and userspace driver are all located in userspace, increasing performance. As well, a plurality of containers is enabled to be provided, as containers are a relatively lightweight. By providing multiple containers, scalability of CU-UP is enabled.

Figure 4A:
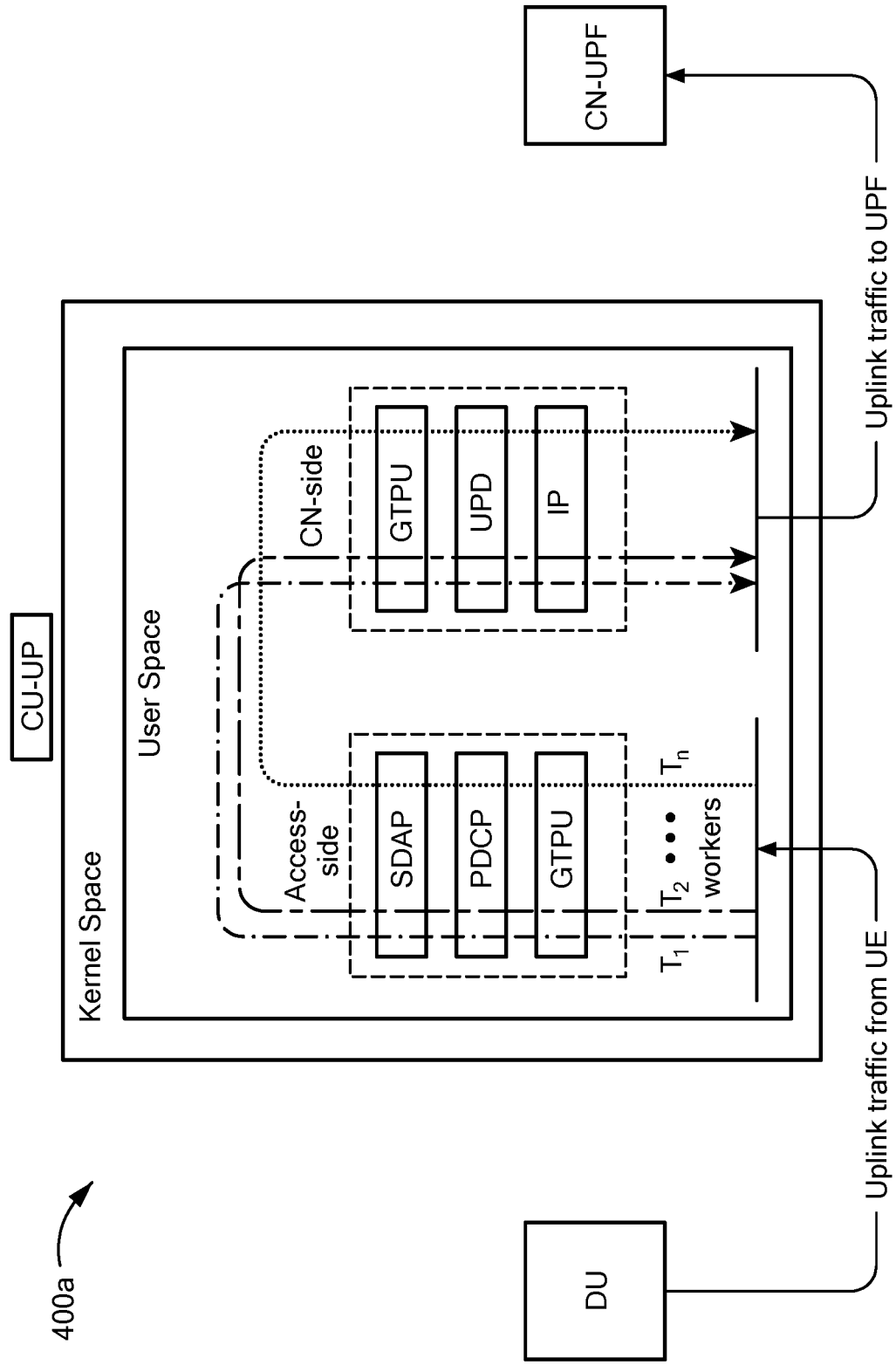
FIG. 4A shows a schematic diagram of uplink communications via a containerized userspace CU-UP, in accordance with some embodiments.

FIG. 4A shows a schematic diagram 400a of uplink communications/traffic flow via a containerized userspace CU-UP, in accordance with some embodiments. DU passes along uplink traffic from the UE to userspace CU-UP. CU-UP receives this traffic at a plurality of worker threads (or containers, processes, etc.). Access-side GTPU, PDCP, and SDAP are performed and then core network side GTPU, UDP and IP processing are performed, all in userspace, and this traffic is sent via a worker thread to CN-UPF. Processing occurs in userspace, bypasses the kernel and is performant. A plurality of workers, threads, or containers is able to be spun up to serve greater traffic, and to be spun down to reduce power usage during inactivity.

Figure 4B:
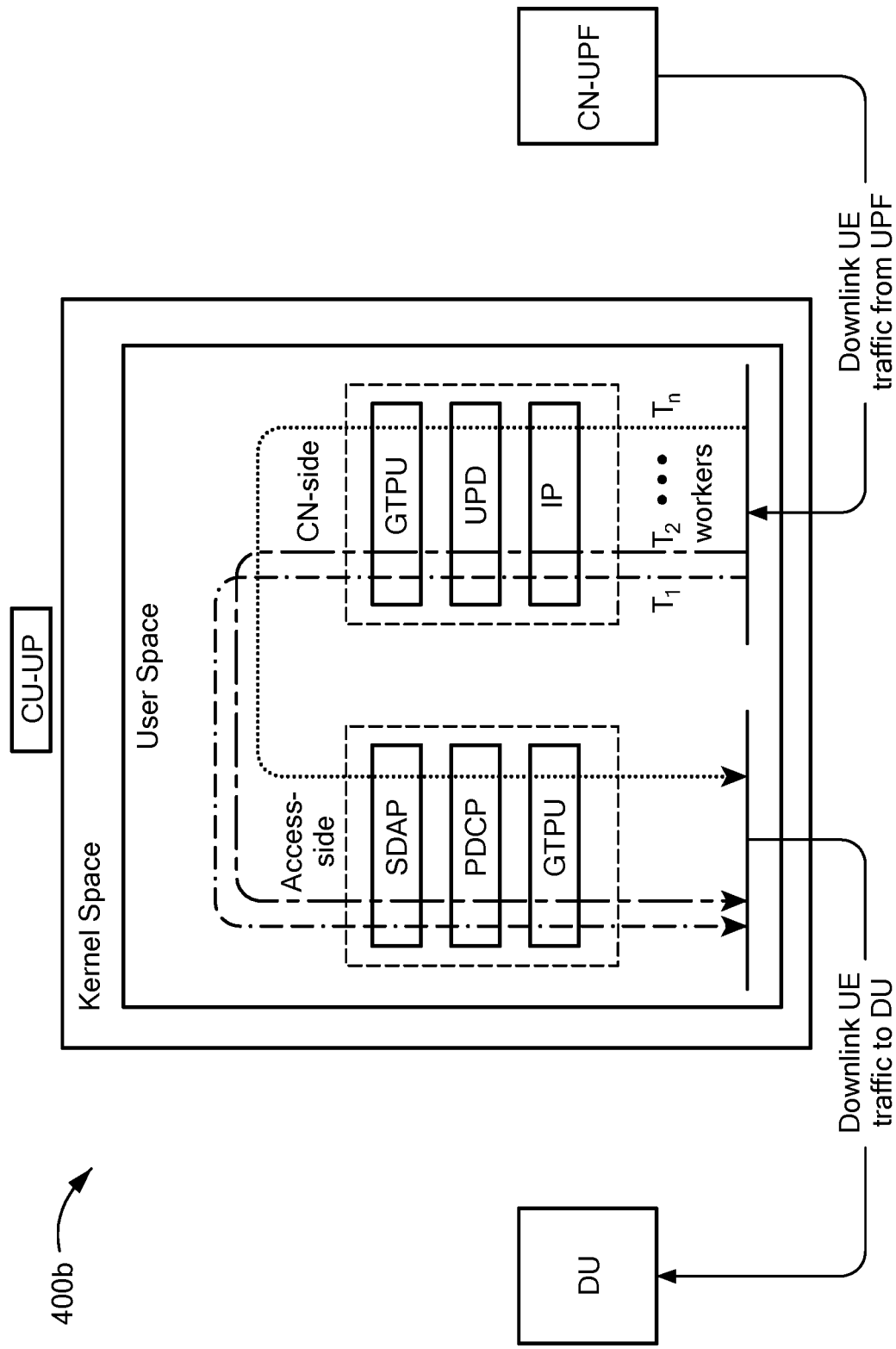
FIG. 4B shows a schematic diagram of downlink communications via a containerized userspace CU-UP, in accordance with some embodiments.

FIG. 4B shows a schematic diagram 400b of downlink communications/traffic flow via a containerized userspace CU-UP, in accordance with some embodiments. CN-UPF passes along downlink UE traffic from UPF, and CU-UP receives this traffic at a plurality of worker threads (or containers, processes, etc.). Core network side IP, UDP, and GTPU processing and then access side SDAP, PDCP and GTPU processing is performed, all in userspace, and this downlink UE traffic is sent via a worker thread to the DU. Processing occurs in userspace, bypasses the kernel and is performant. A plurality of workers, threads, or containers is able to be spun up to serve greater traffic, and to be spun down to reduce power usage during inactivity.

Figure 5:
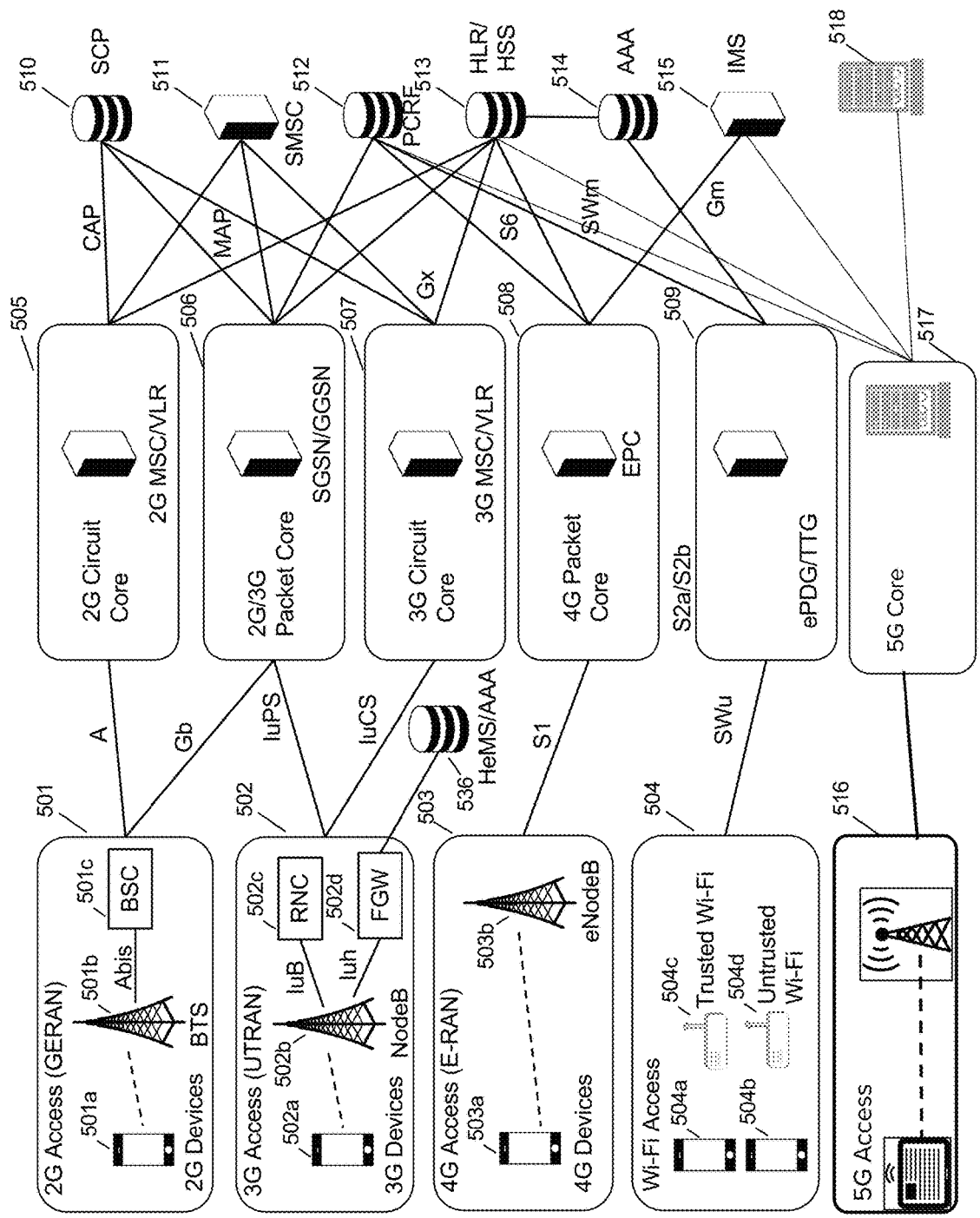
FIG. 5 shows a schematic network architecture diagram for 3G and other-G prior art networks.

FIG. 5 shows a schematic network architecture diagram for 3G and other-G prior art networks. The diagram shows a plurality of "Gs," including 2G, 3G, 4G, 5G and Wi-Fi. 2G is represented by GERAN 501, which includes a 2G device 501a, BTS 501b, and BSC 501c. 3G is represented by UTRAN 502, which includes a 3G UE 502a, nodeB 502b, RNC 502c, and femto gateway (FGW, which in 3GPP namespace is also known as a Home nodeB Gateway or HNBGW) 502d. 4G is represented by EUTRAN or E-RAN 503, which includes an LTE UE 503a and LTE eNodeB 503b. Wi-Fi is represented by Wi-Fi access network 504, which includes a trusted Wi-Fi access point 504c and an untrusted Wi-Fi access point 504d. The Wi-Fi devices 504a and 504b may access either AP 504c or 504d. In the current network architecture, each "G" has a core network. 2G circuit core network 505 includes a 2G MSC/VLR; 2G/3G packet core network 506 includes an SGSN/GGSN (for EDGE or UMTS packet traffic); 3G circuit core 507 includes a 3G MSC/VLR; 4G circuit core 508 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 50, the SMSC 51, PCRF 52, HLR/HSS 53, Authentication, Authorization, and Accounting server (AAA) 54, and IP Multimedia Subsystem (IMS) 55. An HeMS/AAA 56 is present in some cases for use by the 3G UTRAN. The diagram is used to indicate schematically the basic functions of each network as known to one of skill in the art, and is not intended to be exhaustive. For example, 5G core 517 is shown using a single interface to 5G access 516, although in some cases 5G access can be supported using dual connectivity or via a non-standalone deployment architecture.

Noteworthy is that the RANs 501, 502, 503, 504 and 56 rely on specialized core networks 505, 506, 507, 508, 509, 57 but share essential management databases 50, 51, 52, 53, 54, 55, 58. More specifically, for the 2G GERAN, a BSC 501c is required for Abis compatibility with BTS 501b, while for the 3G UTRAN, an RNC 502c is required for Iub compatibility and an FGW 502d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 6:
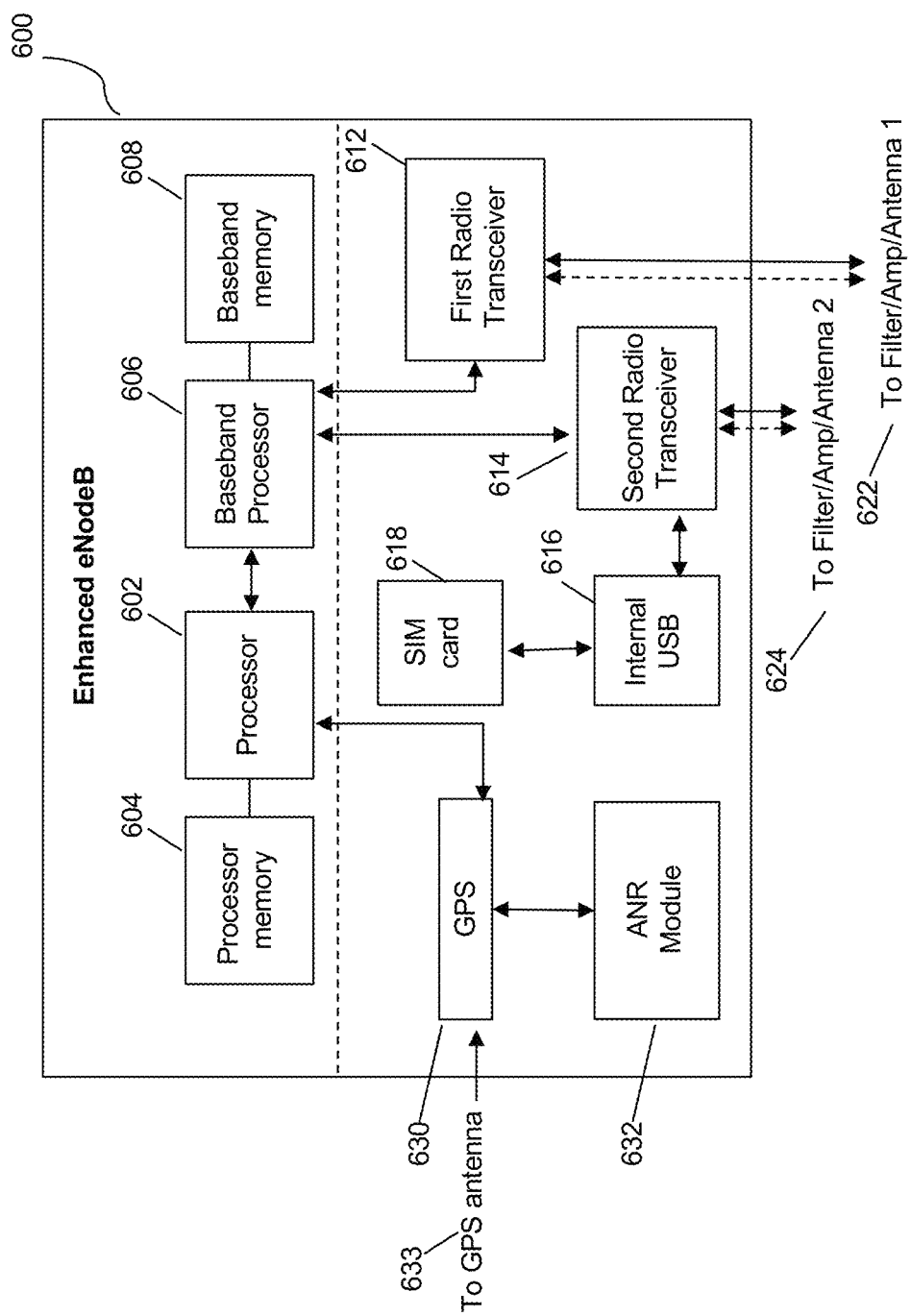
FIG. 6 shows an enhanced eNodeB for performing the methods described herein, in accordance with some embodiments.

FIG. 6 shows an enhanced eNodeB for performing the methods described herein, in accordance with some embodiments. eNodeB 600 may include processor 602, processor memory 604 in communication with the processor, baseband processor 606, and baseband processor memory 608 in communication with the baseband processor. Mesh network node 600 may also include first radio transceiver 612 and second radio transceiver 614, internal universal serial bus (USB) port 616, and subscriber information module card (SIM card) 618 coupled to USB port 616. In some embodiments, the second radio transceiver 614 itself may be coupled to USB port 616, and communications from the baseband processor may be passed through USB port 616. The second radio transceiver may be used for wirelessly backhauling eNodeB 600.

Processor 602 and baseband processor 606 are in communication with one another. Processor 602 may perform routing functions, and may determine if/when a switch in network configuration is needed. Baseband processor 606 may generate and receive radio signals for both radio transceivers 612 and 614, based on instructions from processor 602. In some embodiments, processors 602 and 606 may be on the same physical logic board. In other embodiments, they may be on separate logic boards.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 612 and 614. Baseband processor 606 may use memory 608 to perform these tasks.

The first radio transceiver 612 may be a radio transceiver capable of providing LTE eNodeB functionality, and may be capable of higher power and multi-channel OFDMA. The second radio transceiver 614 may be a radio transceiver capable of providing LTE UE functionality. Both transceivers 612 and 614 may be capable of receiving and transmitting on one or more LTE bands. In some embodiments, either or both of transceivers 612 and 614 may be capable of providing both LTE eNodeB and LTE UE functionality. Transceiver 612 may be coupled to processor 602 via a Peripheral Component Interconnect-Express (PCI-E) bus, and/or via a daughtercard. As transceiver 614 is for providing LTE UE functionality, in effect emulating a user equipment, it may be connected via the same or different PCI-E bus, or by a USB bus, and may also be coupled to SIM card 618. First transceiver 612 may be coupled to first radio frequency (RF) chain (filter, amplifier, antenna) 622, and second transceiver 614 may be coupled to second RF chain (filter, amplifier, antenna) 624.

SIM card 618 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 612 and 614, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 602 for reconfiguration.

A GPS module 630 may also be included, and may be in communication with a GPS antenna 632 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 632 may also be present and may run on processor 602 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 7:
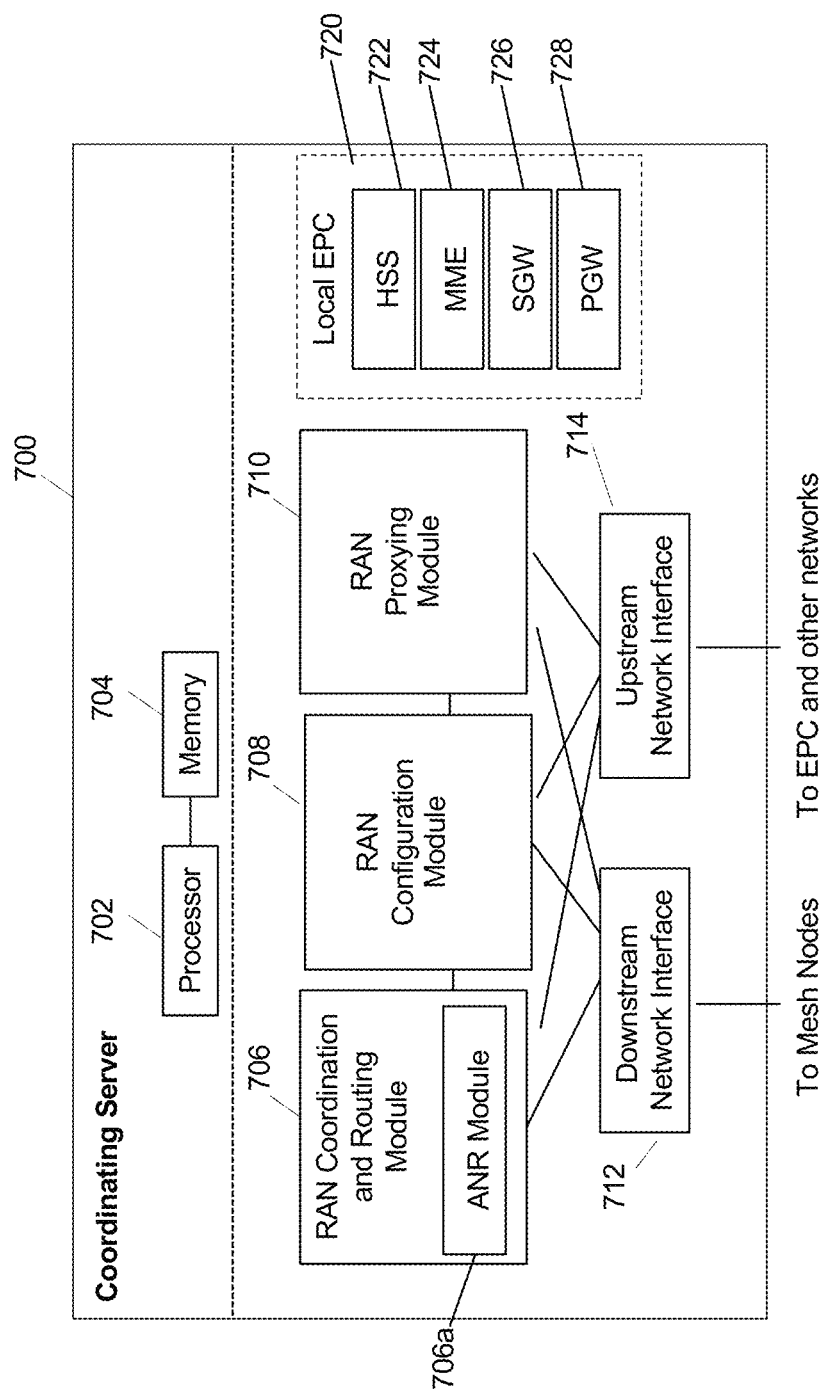
FIG. 7 shows a coordinating server for providing services and performing methods as described herein, in accordance with some embodiments.

FIG. 7 shows a coordinating server for providing services and performing methods as described herein, in accordance with some embodiments. Coordinating server 700 includes processor 702 and memory 704, which are configured to provide the functions described herein. Also present are radio access network coordination/routing (RAN Coordination and routing) module 706, including ANR module 706a, RAN configuration module 708, and RAN proxying module 710. The ANR module 706a may perform the ANR tracking, PCI disambiguation, ECGI requesting, and GPS coalescing and tracking as described herein, in coordination with RAN coordination module 706 (e.g., for requesting ECGIs, etc.). In some embodiments, coordinating server 700 may coordinate multiple RANs using coordination module 706. In some embodiments, coordination server may also provide proxying, routing virtualization and RAN virtualization, via modules 710 and 708. In some embodiments, a downstream network interface 712 is provided for interfacing with the RANs, which may be a radio interface (e.g., LTE), and an upstream network interface 714 is provided for interfacing with the core network, which may be either a radio interface (e.g., LTE) or a wired interface (e.g., Ethernet).

Coordinator 700 includes local evolved packet core (EPC) module 720, for authenticating users, storing and caching priority profile information, and performing other EPC-dependent functions when no backhaul link is available. Local EPC 720 may include local HSS 722, local MME 724, local SGW 726, and local PGW 728, as well as other modules. Local EPC 720 may incorporate these modules as software modules, processes, or containers. Local EPC 720 may alternatively incorporate these modules as a small number of monolithic software processes. Modules 706, 708, 710 and local EPC 720 may each run on processor 702 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

In some embodiments, a software or hardware accelerator may be used. In some embodiments, an Intel Data Plane Development Kit, netmap, PF_RING ZC, or another framework for high-performance packet I/O may be used. In some embodiments, polling may be used instead of interrupts to accelerate processing. In some embodiments, CPU and memory may be adequately provisioned to provide high performance characteristics.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method, comprising:
   receiving a packet at a network processing stack, the packet being a Stream Control Transmission Protocol (SCTP) packet carrying User Equipment (UE) user plane data, the network processing stack having a kernel driver and a userspace driver;
   passing the packet to a Control Unit-User Plane (CU-UP) as a user space application with kernel-bypass networking;
   performing packet Input/Output (I/O) by the CU-UP user-space application, wherein the CU-UP performs Internet Protocol (IP) validation on received user-plane packets before processing Packet Data Convergence Protocol (PDCP), Service Data Adaptation Protocol (SDAP) and General Packet Radio Service Tunnelling Protocol (GTPU) protocol stack; and
   performing, via the userspace driver of the network processing stack, direct I/O to the Network Interface Controller (NIC) for sending the packet over an F1-U interface to a Distributed Unit (DU) at a cellular base station,
   wherein the userspace driver is in a same container as the CU-UP.

2. The method of claim 1, further comprising using a containerized CU-UP.

3. The method of claim 1, further comprising using a plurality of worker threads.

4. The method of claim 1, further comprising using a polling user space networking accelerator framework.

* * * * *